Jan. 16, 1934.   J. GEIER   1,943,309
PROJECTION APPARATUS
Filed Aug. 15, 1932   4 Sheets-Sheet 1

INVENTOR
JAMES GEIER
BY Oscar A. Geier
ATTORNEY

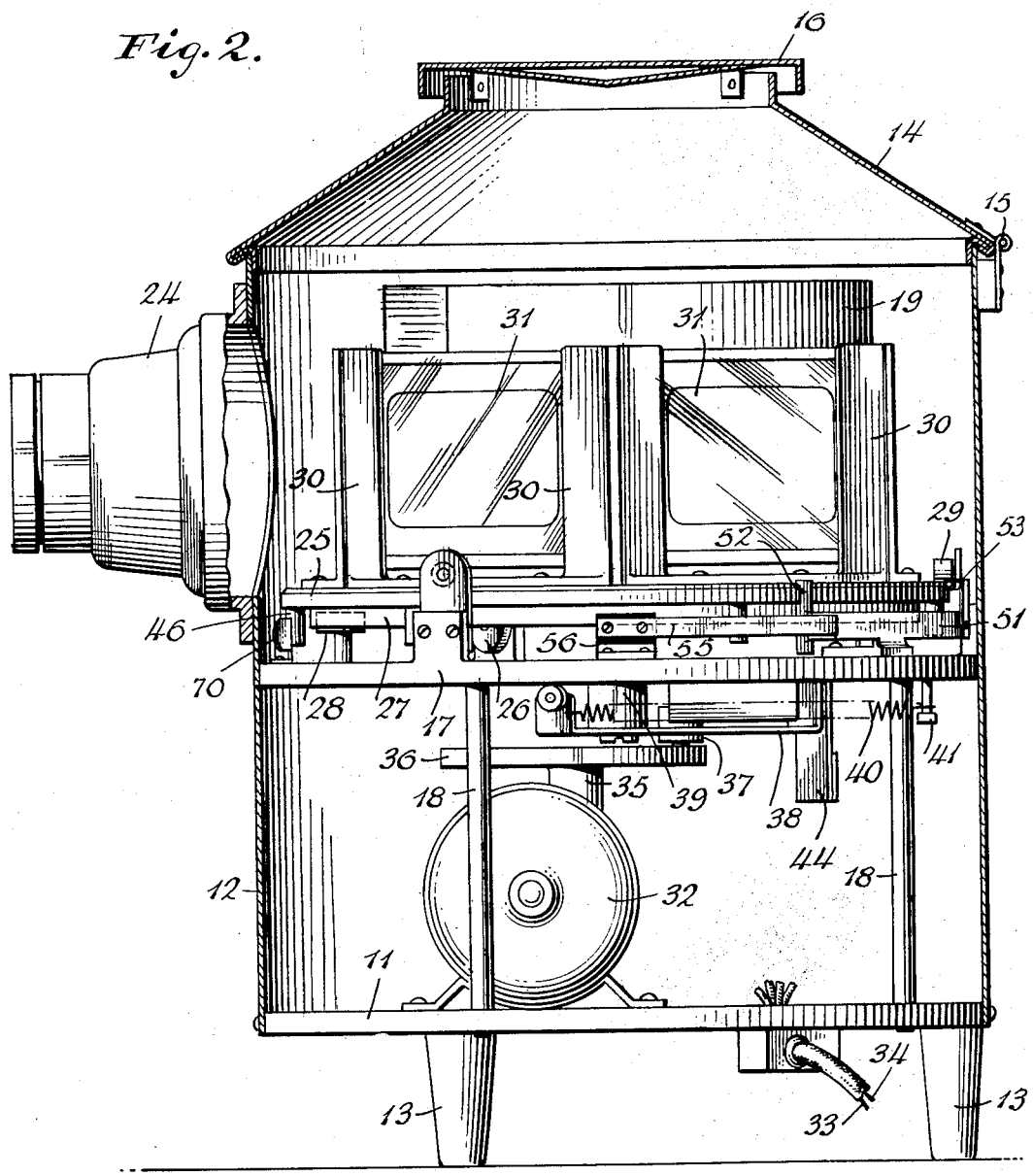

Jan. 16, 1934. J. GEIER 1,943,309
PROJECTION APPARATUS
Filed Aug. 15, 1932 4 Sheets-Sheet 3
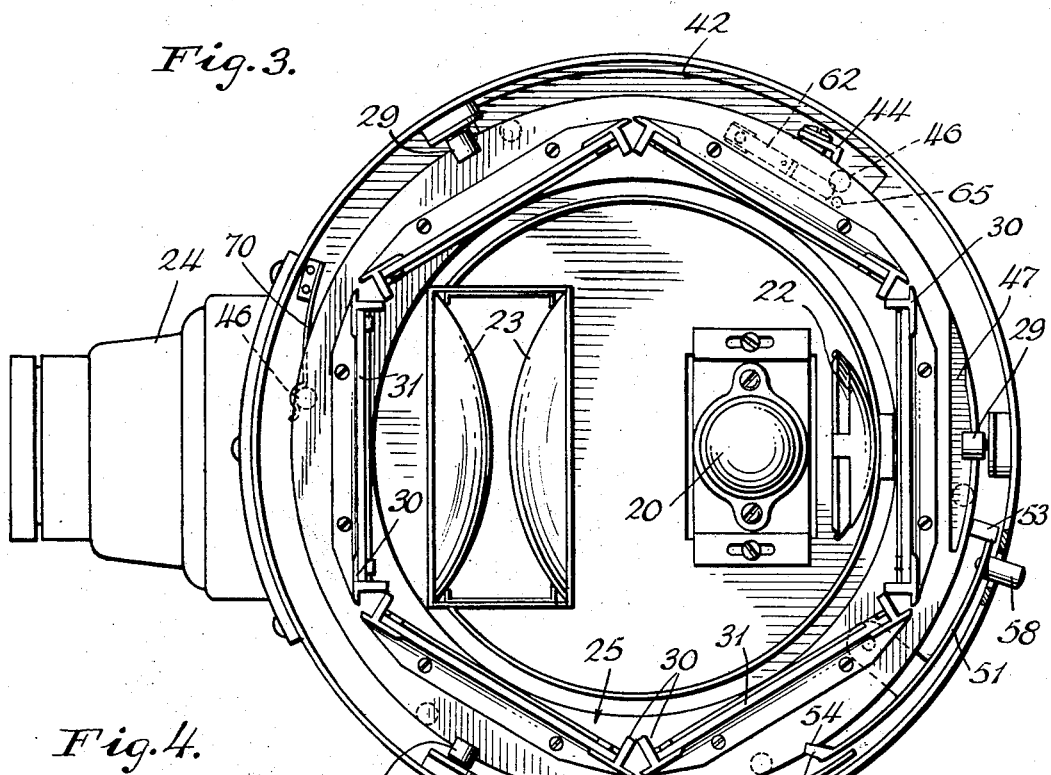
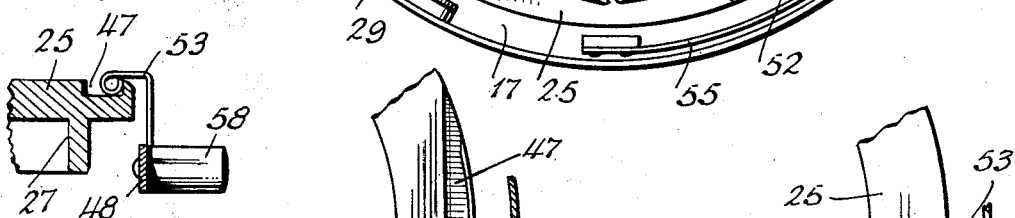
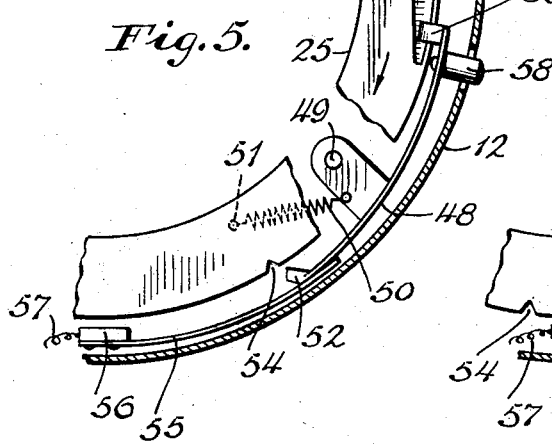
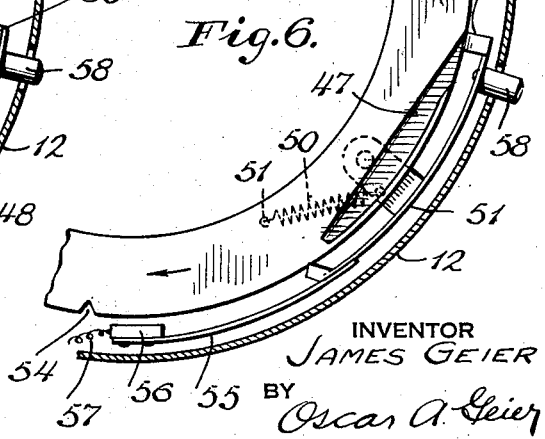
INVENTOR
JAMES GEIER
BY Oscar A. Geier
ATTORNEY Jan. 16, 1934.  J. GEIER  1,943,309
PROJECTION APPARATUS
Filed Aug. 15, 1932  4 Sheets-Sheet 4
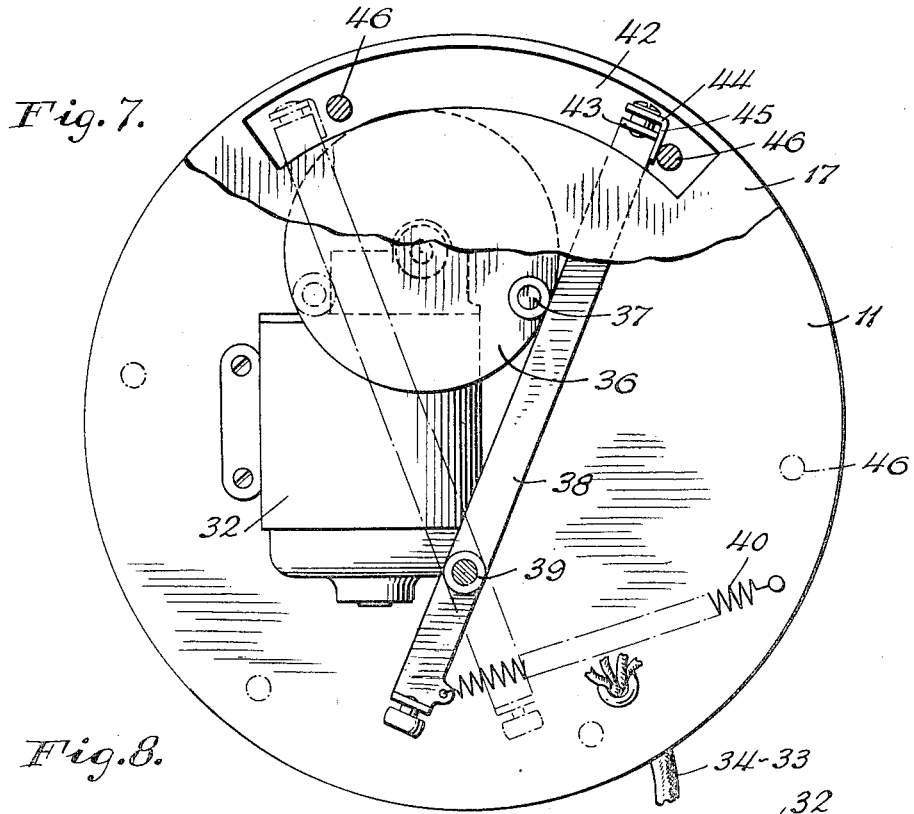
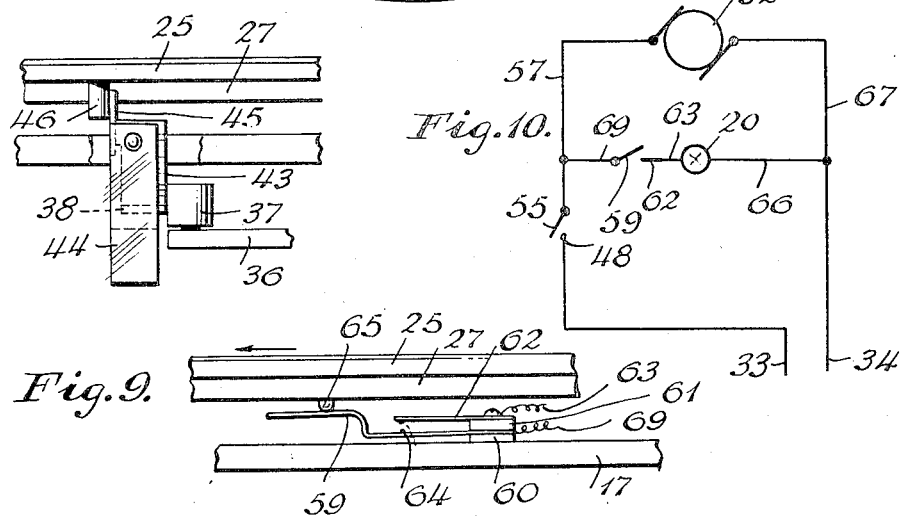
INVENTOR
JAMES GEIER
BY
Oscar A. Geier
ATTORNEY Patented Jan. 16, 1934

1,943,309

UNITED STATES PATENT OFFICE 1,943,309

PROJECTION APPARATUS

James Geier, Troy, N. Y.

Application August 15, 1932. Serial No. 628,842

2 Claims. (Cl. 88—27)

This invention relates to improvements in a projection apparatus and has particular reference to an apparatus for successively projecting a number of different advertisements, views or the like onto a screen.

An object of this invention is to provide an apparatus having a horizontal slide carrier which is rotated automatically and intermittently around a vertical axis for the purpose of successively bringing the different slides into position for projection, and permitting each slide to remain stationary for a predetermined period of time during projection.

Another object is to provide an apparatus having automatic means for stopping the rotation of the slide carrier after one revolution of the same has been completed.

A further object is to provide a projection apparatus having automatic means for switching off the lamp of the apparatus after the last slide of the set carried by the rotary slide carrier has been exhibited but before the slide carrier has finished a complete revolution.

The above and other objects of this invention will appear more clearly from the following detailed description when taken in connection with the accompanying drawings showing a preferred embodiment of the inventive idea.

In the drawings:—

Figure 2 shows the projection apparatus in side elevation, parts of the external casing being broken off.

Figure 3 is a top view of the projection apparatus with its cover removed.

Figure 4 is a section through a part of the slide carrier and shows a hook projecting into a groove formed in said carrier.

Figure 5 shows the device for automatically stopping the rotation of the slide carrier.

Figure 6 is similar to Figure 5 and shows the same device in a different position.

Figure 7 is a horizontal cross-section along the line 7—7 of Figure 1, with some parts broken off.

Figure 8 shows, on a larger scale, some of the means for rotating the slide carrier.

Figure 9 shows the device for automatically switching off the lamp of the projection apparatus.

Figure 10 is a diagram showing the electrical wire connections of the apparatus.

Figure 1:
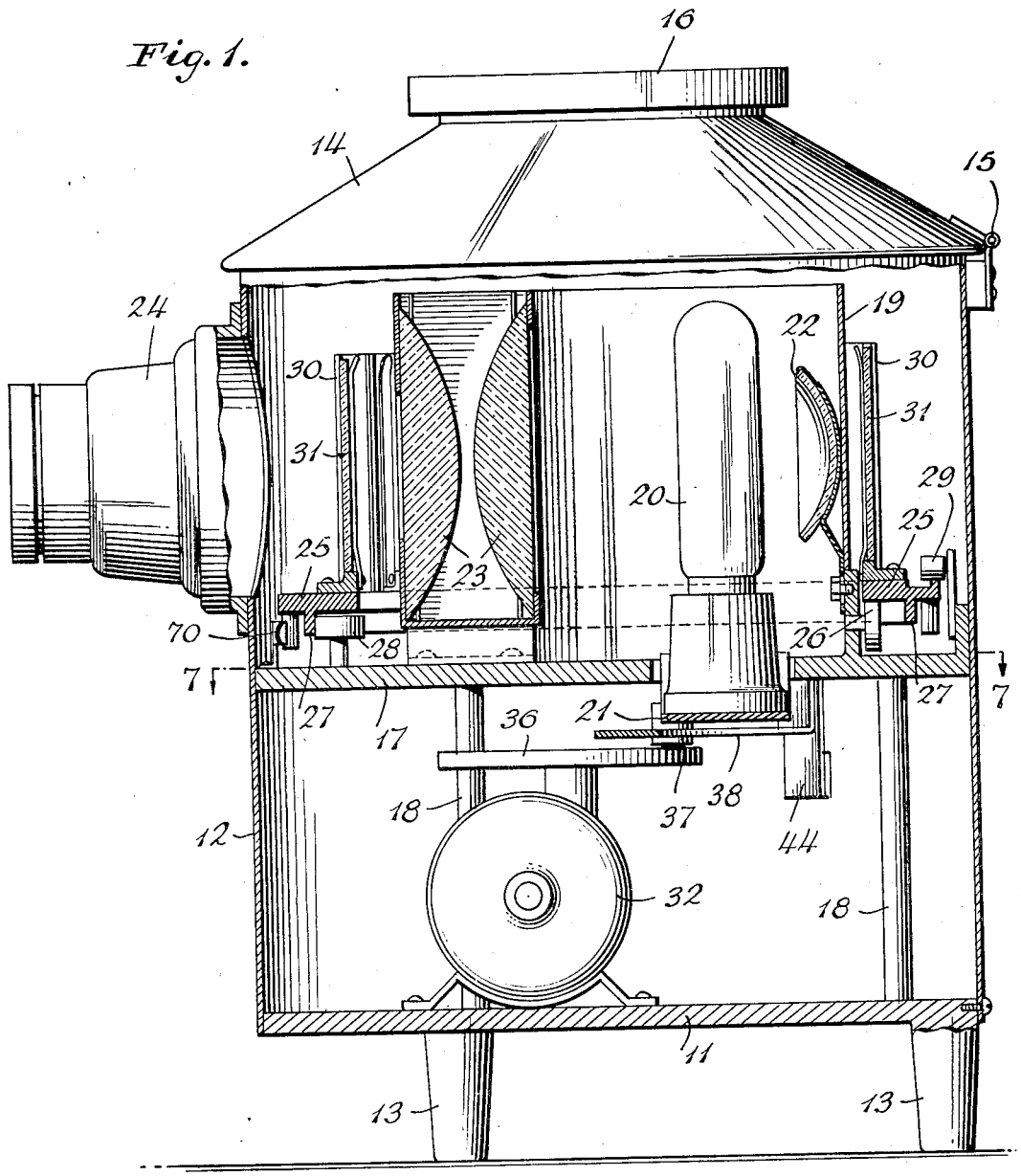
Figure 1 is partly a side view and partly a vertical section through a projection apparatus.

The projection apparatus shown in Figures 1, 2 and 3 of the drawings is mounted within a casing 12 provided with a cover 14 which is connected with the casing by means of hinges 15. The upper part 16 of the cover is made of a separate removable piece. The apparatus is mounted on a plate 11 supported by legs 13. A plate 17 which is carried by supports 18 extends across the entire casing 12 and carries an inner casing 19 which surrounds a lamp 20 mounted on a plate 21. A reflector 22 is carried by a bracket supported by the plate 17. Condensing lenses 23 are situated between the lamp 20 and the projecting lens set 24. A horizontal ring 25 is carried by rotatable rollers 26 which are supported by brackets carried by the plate 17. The ring 25 is provided with a vertical flange 27; the inner surface of said flange is in contact with the side surfaces of the rollers 28 which are rotatably mounted on the plate 17 and are used to hold the ring 25 in its proper position. Rollers 29 are mounted on brackets carried by the plate 17 and are adapted to be in contact with the upper surface of the ring 25 to prevent the ring from being jerked upwards. In this way the three sets of rollers 26, 28 and 29 allow the ring to rotate in a horizontal direction but at the same time keep it at an unchanging distance from the lenses 23 and 24. A number of slide frames 30 provided with guides for the slides 31 are mounted on the ring 25. The slides 31 may be easily removed by the operator after he has raised the cover 14 and new slides may be inserted in their stead.

An electromotor 32 is situated below the plate 17 and is operated by a current supplied by the wires 33 and 34. The rotation of the motor shaft is transmitted to a vertical shaft 35 which is firmly connected with a disc 36 carrying a pin 37. A lever 38 is carried by a pin 39 rotatably mounted in the plate 17 and is so suspended above the disc 36 that it is in contact with the pin 37. A spring 40 is connected with one end of the lever 38, the other end of the spring being attached to a screw 41 carried by the plate 17. The spring 40 presses the lever 38 against the pin 37 and thus compels it to follow the movements of the pin. While the pin 37 rotates along with the disc 36 and the shaft 35 which is driven by the motor 32, the lever 38 oscillates from the position shown in full lines in Figure 7 to the position shown in broken lines in the same figure.

The plate 17 is provided with a wide slot 42 shown in Figure 7. One end of the lever 38 is bent upwards and projects through the slot 42; this bent end forms a carrier 43 for a suspension member 44 which is pivoted to the member 43 and is provided with an abutment 45 adapted to come in contact with said member 43. Due to this arrangement the member 44 can swing around its pivot in one direction only. As illustrated in Figure 8, the member 44 may swing to the right but it is prevented from swinging to the left through the engagement of one of the side surfaces of the abutment 45 with the member 43. The opposite surface of the abutment 45 may come in contact with one of the pins 46 which are carried by the ring 25 and are firmly connected therewith. The number of pins 46 is equal to the number of slides 31 carried by the ring 25.

As shown in Figures 5 and 6, the device for stopping and releasing the ring 25 comprises a double-armed T-shaped lever 48 pivoted at 49 to the plate 17 and connected with a spring 50. The opposite end of the spring 50 is connected with a pin 51 which is fixed to the plate 17. One end of the double-armed lever 48 carries a pawl 52 which can slide over the side surface of the ring 25, while the other end of the lever 48 carries a hook 53, shown in Figure 4. The bent end of the hook 53 is situated approximately on the same level as the upper surface of the ring 25 and may be inserted into a groove 47 formed in said ring. The ring 25 is also provided with a vertical notch 54 and the pawl 52 carried by the lever 48 is adapted to come into engagement with the walls of said notch. A flat spring 55 is carried by a bracket 56 supported by the plate 17 and is connected with a conducting wire 57 which is connected with the motor 32. The lever 48 which is also made of a conducting material, is provided with a press button 58 which projects through a slot formed in the casing 12 and is made of an insulating material.

The device shown in Figure 9 is used for switching off the lamp 20 after all the pictures have been shown by the projection apparatus but before the slide which was shown first, has returned to its original position in front of the condensing lenses 23. This device comprises a bent flat spring 59 which is made of conducting material and is carried by a support 60 fixed to the plate 17. A layer of insulation 61 separates the spring 59 from another conducting spring 62 which is connected with the lamp 20 by means of a wire 63. A pair of contacts 64 carried by the springs 59 and 62, respectively, are adapted to be in contact with each other until a pin 65 carried by the ring 25, 27 comes in contact with the upper bent surface of the lever 59. Then the pin 65 presses the spring 59 downward thus interrupting an electrical circuit which includes the lamp 20 of the projection apparatus. The springs 59 and 62 are situated on the plate 17 in such a position that the circuit of the lamp 20 is interrupted after the last picture has been shown to the audience. A wire 69 connected with the spring 59 is used to conduct the current passing through said spring to the automatic switch of the machine.

One end of a spring 70, shown in Figure 3, is connected with the plate 17, while the other end of said spring is bent and is adapted to engage one of the pins 46. The spring 70 is used to hold the ring 25 in its proper position with respect to the lenses 23 and 24. However, the action of the spring 70 is not strong enough to prevent the ring 25 from being rotated by the lever 38 during the backward stroke of the latter.

The electrical wiring of the projection apparatus is shown diagrammatically in Figure 10 of the drawings. The wires 33 and 34 are connected with a source of electrical energy not shown in the drawings. The wire 33 is connected with the lever 48. The wire 34 is connected with two wires 66 and 67. The wire 66 is connected with the lamp 20, while the wire 67 is connected with the motor 32. The wire 57 which is connected with the motor 32 is also attached to the spring 55 as shown in Figures 5 and 6, and to the wire 69. Since the lever 48 which comes in contact with the spring 55 is electrically connected with the wire 33, a current will flow through the wire 57, the spring 55, the lever 48, and the wire 33, provided that the spring 55 and the lever 48 remain in contact with each other. The wire 63 connected with the lamp 20 is also connected with the spring 62 shown in Figure 9. The spring 59 which is in contact with the spring 62 is connected with the wire 69.

The apparatus does not operate when the pawl 52 carried by the lever 48 is situated within the notch 54. In that case the lever 48 and the spring 55 are out of contact with each other so that the switch formed by these two members is open and there is no current flowing through the motor 32 and the lamp 20. In order to close the circuit the operator presses the button 58 carried by the lever 48 and brings said lever into the position shown in Figure 5. In this position the lever 48 and the spring 55 are in contact with each other so that the switch formed by these two members is closed. As a result of this an electric current will flow through the wires 34 and 67, the motor 32, the wire 57, the spring 55, the lever 48, and the wire 33. Another electrical circuit connected in parallel with the one just described will include the wires 34 and 66, the lamp 20, the wire 63, the springs 62 and 59, the wire 69, the wire 57, the spring 55, the lever 48 and the wire 33. In this position the hook-shaped member 53 carried by the lever 48 projects into the groove 47 formed in the ring 25 and thus maintains the lever 48 in the position shown in Figure 5. The rotation of the motor is transmitted to the disc 36 carrying a pin 37. The lever 38 which is pressed against the pin 37 by the spring 40, follows the movements of the pin and swings from the position shown by full lines in Figure 7 to the position shown by broken lines in the same figure. During this movement the abutment 45 of the member 44 suspended from the lever 38 meets one of the pins 46 carried by the ring 25. Since the member 44 is able to swing in one direction, the abutment 45 will pass under the pin 46 and the lever 36 will assume the position shown by broken lines in Figure 7. In the course of further rotation the pin 37 will move the lever 38 back to its original position. During this backward stroke of the lever 38 the abutment 45 of the member 44 will again come in contact with the same pin 46, as shown in Figure 4. Since the member 44 cannot rotate in two directions and thus can no longer avoid the pin, the abutment 45 will push this pin along until the lever 38 assumes its position shown by full lines in Figure 7. Since the pins 46 are firmly connected with the ring 25, this ring will also be rotated by the lever 38 during the backward stroke of the latter. During this rotation the hook 53 will leave the groove 47 and will come into the position shown in Figure 6 in which the hook is pressed against the side surface of the ring 25 by means of the spring 50. The lever 38 and the ring 25 are of such dimensions that after the lever 38 has completed its backward stroke, one of the slides 31 carried by the ring 25 will be removed from its position between the lenses 24 and 23 and the adjacent slide will be inserted in its stead. During the next forward stroke of the lever 38, the ring 25 is not moved so that the spectators have sufficient time in which to examine the projected slide. During the next backward stroke the abutment 45 again comes in contact with a pin 46 and rotates the ring 25 until the next slide has taken the place of the preceding one. This operation is repeated until all the slides have been shown to the audience.

In the example illustrated in the drawings, the ring 25 carries six slides although obviously this number may be increased or diminished in accordance with the various requirements. After the last slide has been shown to the spectators, the current flowing through the lamp 20 is interrupted, although the motor 32 continues to function until one full revolution of the ring 25 is completed and the first slide is placed again in its original position between the lenses 23 and 24. This is accomplished by means of the switch shown in Figure 9 of the drawings. The various parts of the switch are so placed on the plate 17 that the pin 65 carried by the ring 25, 27 comes in contact with the spring 59 just after the lever 38 begins to remove the last slide from the view of the spectators. Due to the pressure of the pin 65, the contact between the springs 59 and 62 is interrupted, so that no current can flow through the lamp 20. However, the circuit which comprises the motor 32 is still closed so that the motor continues to operate and the lever 38 by rotating the ring 25 brings the first slide back into its original position. At this time the notch 54 reaches the pawl 52 which snaps into the notch through the action of the spring 50 and interrupts the current flowing through the spring 55 and the lever 48. Then the motor 32 stops and the device becomes inoperative. This cycle of operations can be repeated by pressing down the button 58.

What is claimed is:

1. In a projection apparatus, a revolvable horizontal carrying member with a plurality of receivers receiving projection slides, said horizontal member having a vertical axis of rotation and being provided with a peripheral ring, supporting roller members cooperating with said ring to fix the axis of rotation of the member, said apparatus being provided with a projection position located between a source of illumination and a focusing device, into which position said slides are to be successively placed, means for intermittently rotating said member including a lever and roller arrangement whereby the slides are slowly moved out of and into projection positions, and automatic operating means for stopping the revolving or rotation of said member after all of said slides have passed the projection position.

2. In a projection apparatus, a revolvable horizontal carrying member with a plurality of receivers receiving projection slides, said horizontal member having a vertical axis of rotation and being provided with a peripheral ring, supporting roller members cooperating with said ring to fix the axis of rotation of the member, said apparatus being provided with a projection position located between a source of illumination and a focusing device, into which position said slides are to be successively placed, means for intermittently rotating said member including a lever and roller arrangement whereby the slides are slowly moved out of and into projecting positions, and automatic operating means for stopping the revolving rotation of said member after all of said slides have passed the projection position, said source of illumination including an incandescent light, a lens arrangement and a reflector arrangement positioned centrally within the member and said intermittent rotating or revolving means including an electrical motor, a roller positioned substantially away from its center of rotation driven by said motor and a lever intermittently turning said member provided with resilient means whereby it is caused to press against said roller and to be moved upon movement of said roller.

JAMES GEIER.